(12) United States Patent
Su et al.

(10) Patent No.: US 11,822,851 B2
(45) Date of Patent: Nov. 21, 2023

(54) INFORMATION DISPLAY SYSTEM, INFORMATION DISPLAY METHOD, AND PROCESSING DEVICE

(71) Applicant: Industrial Technology Research Institute, Hsinchu (TW)

(72) Inventors: Yu-Hsuan Su, Kaohsiung (TW); Yu-Hsiang Tsai, Hsinchu County (TW); Hong-Ming Dai, Tainan (TW); Ya-Rou Hsu, Miaoli County (TW); Kai-Shun Lin, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/979,785

(22) Filed: Nov. 3, 2022

(65) Prior Publication Data

US 2023/0161537 A1    May 25, 2023

Related U.S. Application Data

(60) Provisional application No. 63/278,071, filed on Nov. 10, 2021.

(30) Foreign Application Priority Data

Aug. 10, 2022    (TW) .................................. 111130006

(51) Int. Cl.
*G06F 3/14* (2006.01)
*G06F 3/01* (2006.01)
(Continued)

(52) U.S. Cl.
CPC ....... *G06F 3/1446* (2013.01); *G02B 27/0101* (2013.01); *G02B 27/0179* (2013.01);
(Continued)

(58) Field of Classification Search
CPC ........ G06F 3/1446; G06F 3/013; G06F 3/147; G02B 27/0101; G02B 27/0179; G02B 2027/014; G02B 2027/0187
See application file for complete search history.

(56) References Cited

U.S. PATENT DOCUMENTS

| 10,614,780 | B2 * | 4/2020 | Chang ..................... G06T 7/248 |
| 10,904,615 | B2 | 1/2021 | Boss et al. |
| 2014/0022283 | A1 * | 1/2014 | Chan .................... H04N 9/3185 |
| | | | 345/633 |
| 2014/0253670 | A1 * | 9/2014 | Nakatomi ................ H04N 7/15 |
| | | | 348/14.07 |

(Continued)

FOREIGN PATENT DOCUMENTS

| CN | 105589199 | 5/2016 |
| TW | 201814320 | 4/2018 |

(Continued)

OTHER PUBLICATIONS

"Office Action of Taiwan Counterpart Application", dated Apr. 27, 2023, p. 1-p. 6.

*Primary Examiner* — Dmitriy Bolotin
(74) *Attorney, Agent, or Firm* — JCIPRNET

(57) ABSTRACT

An information display system, an information display method, and a processing device are disclosed. The system includes a plurality of light-transmissive displays and a plurality of processing devices connected and communicating with each other through gateways. A first processing device is selected from the processing devices according to position information of a user, and determines sight line information of the user according to the position information and posture information of the user. A second processing device different from the first processing device calculates a target coordinate of a target. The first processing device selects a third processing device from the processing devices according to the sight line information of the user. The third processing device determines display position information of a virtual object according to a user coordinate and the (Continued)

object coordinate, and controls one of the displays to display the virtual object according to the display position information.

19 Claims, 15 Drawing Sheets

(51) Int. Cl.
    *G06F 3/147*     (2006.01)
    *G02B 27/01*     (2006.01)

(52) U.S. Cl.
    CPC .............. *G06F 3/013* (2013.01); *G06F 3/147* (2013.01); *G02B 2027/014* (2013.01); *G02B 2027/0187* (2013.01)

(56) References Cited

U.S. PATENT DOCUMENTS

| | | | |
|---|---|---|---|
| 2017/0053437 A1 | 2/2017 | Ye et al. | |
| 2018/0303558 A1* | 10/2018 | Thomas | A61B 34/20 |
| 2021/0004082 A1 | 1/2021 | Suk et al. | |
| 2021/0200498 A1* | 7/2021 | Wang | G06F 3/147 |
| 2021/0400234 A1* | 12/2021 | Miki | G06V 20/52 |
| 2022/0334388 A1* | 10/2022 | Dai | G06T 7/70 |

FOREIGN PATENT DOCUMENTS

| | | |
|---|---|---|
| TW | I659334 | 5/2019 |
| TW | 202109272 | 3/2021 |
| TW | 202125401 | 7/2021 |

\* cited by examiner

INFORMATION DISPLAY SYSTEM, INFORMATION DISPLAY METHOD, AND PROCESSING DEVICE

CROSS-REFERENCE TO RELATED APPLICATION

This application claims the priority benefit of U.S. provisional application Ser. No. 63/278,071, filed on Nov. 10, 2021, and Taiwan application serial no. 111130006, filed on Aug. 10, 2022. The entirety of each of the above-mentioned patent applications is hereby incorporated by reference herein.

BACKGROUND

Technical Field

The disclosure relates to an information display system, an information display method, and a processing device.

Description of Related Art

With the development of image processing technology and spatial positioning technology, applications of a transparent display has gradually received attention. Such technology, combined with physical objects and aided with virtual objects, allows the display to generate an interactive experience depending on needs of a user, and present information in a relatively intuitive way.

Furthermore, a virtual object associated with a physical object may be displayed on specific positions of the transparent display, so that the user can see the physical object and the virtual object superimposed on, or at one side of, the physical object through the transparent display at the same time. For example, with the transparent display disposed on an observation deck, a viewer can see the landscape and landscape information provided by the transparent display at the same time. However, in some large-scale application scenarios, a combination of multiple transparent displays may be required to provide information display services of merged virtuality and reality, and there may also be a greater number of physical objects and users. Therefore, if a single central computing device is configured to be in charge of all computing tasks, computational delays may occur because of excessive computing load or other factors, resulting in failure to provide the viewer with real-time display services of merged virtuality and reality.

SUMMARY

In an exemplary embodiment of the disclosure, an information display system includes a plurality of light-transmissive displays, a plurality of perception information capture devices, and a plurality of processing devices. The plurality of perception information capture devices are configured to capture position information and posture information of a user and capture position information of a target. The plurality of processing devices respectively correspond to the displays, and are connected to and communicate with each other through a plurality of gateways. A first processing device is selected from the processing devices according to the position information of the user. The first processing device determines sight line information of the user according to the position information and the posture information of the user provided by the perception information capture devices. A second processing device different from the first processing device performs coordinate conversion and calculates a target coordinate of the target according to the position information of the target provided by the perception information capture devices. The first processing device selects a third processing device from the processing devices according to the sight line information of the user. The third processing device determines display position information of a virtual object according to a user coordinate and the target coordinate. The third processing device controls one of the displays to display the virtual object according to the display position information of the virtual object.

In an exemplary embodiment of the disclosure, an information display method is adapted for an information display system including a plurality of light-transmissive displays, a plurality of perception information capture devices, and a plurality of processing devices. The information display method includes the following. The perception information capture devices are configured to capture position information and posture information of a user and position information of a target. A first processing device is selected from the processing devices according to the position information of the user. Sight line information of the user is determined by the first processing device according to the position information and the posture information of the user provided by the perception information capture devices. Coordinate conversion is performed and a target coordinate of the target is calculated by a second processing device different from the first processing device according to the position information of the target provided by the perception information capture devices. A third processing device is selected from the processing devices according to the sight line information of the user. By the third processing device, display position information of a virtual object is determined according to a user coordinate and the target coordinate, and one of the displays is controlled to display the virtual object according to the display position information of the virtual object.

In an exemplary embodiment of the disclosure, a processing device is connected to a light-transmissive display and a perception information capture device, and is connected to a plurality of other processing devices through a plurality of gateways. The perception information capture device is configured to capture position information and posture information of a user and capture position information of a target. The processing device includes a memory and a processor. The memory is configured to store data. The processor is connected to the memory and is configured to: determine, by the perception information capture device, that a distance between the processing device and the user is less than a distance between each of the plurality of other processing devices and the user; determine sight line information of the user according to the position information and the posture information of the user provided by the perception information capture device; and select one of the plurality of processing devices according to the sight line information of the user, and transmit the sight line information of the user to the one of the plurality of processing devices through the gateways. The one of the plurality of processing devices determines display position information of a virtual object according to the sight line information, a user coordinate, and a target coordinate, and controls the display or another display connected to the other processing devices to display the virtual object according to the display position information of the virtual object.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1A:
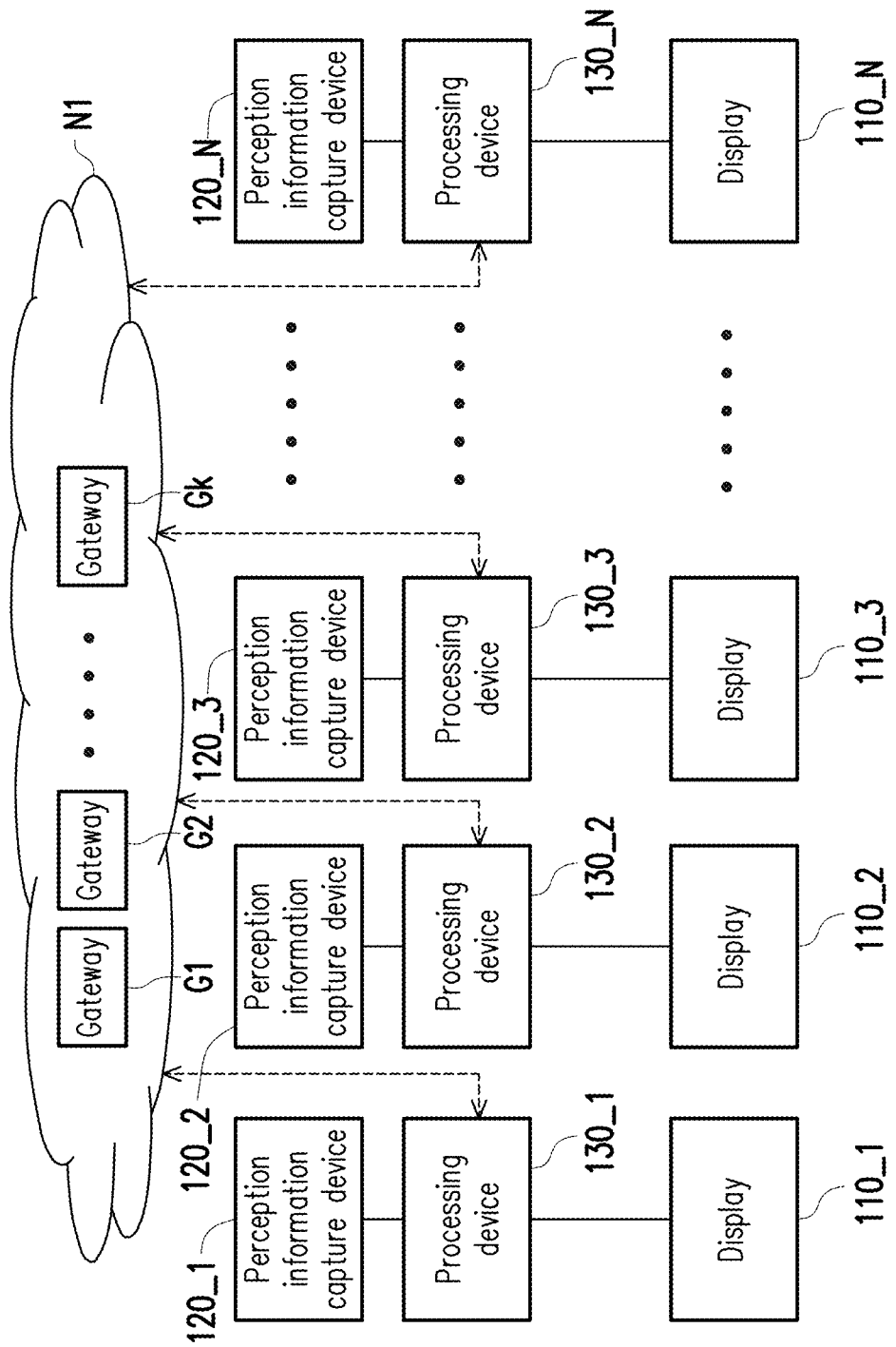
FIG. 1A is a block diagram of an information display system according to an exemplary embodiment of the disclosure.

Some exemplary embodiments of the disclosure with the accompanying drawings will be described in detail. For the reference numerals used in the following description, the same reference numerals shown in different drawings will be regarded as the same or similar elements. These exemplary embodiments are only a part of the disclosure and do not disclose all possible implementations of the disclosure. More specifically, these exemplary embodiments are merely examples of the method and the system within the scope of the disclosure.

FIG. 1A is a block diagram of an information display system according to an exemplary embodiment of the disclosure. FIG. 1A first introduces members in the system and their configuration relationships, and detailed functions thereof will be disclosed together with the flowcharts of the subsequent exemplary embodiments.

With reference to FIG. 1A, an information display system 10 in this exemplary embodiment may include a plurality of displays 110_1, 110_2, 110_3, . . . , and 110_N, a plurality of perception information capture devices 120_1, 120_2, 120_3, . . . , and 120_N, and a plurality of processing devices 130_1, 130_2, 130_3, . . . , and 130_N. The processing devices 130_1 to 130_N may be wirelessly, wiredly, or electrically connected to respectively the displays 110_1 to 110_N and the perception information capture devices 120_1 to 120_N. Note that, to serve as an example for description in the exemplary embodiment of FIG. 1A, one processing device is connected to one display and one perception information capture device, for example, the processing device 130_1 is connected to the display 110_1 and the perception information capture device 120_1, but the disclosure is not limited thereto. In other examples, one processing device may be connected to a plurality of perception information capture devices or a plurality of displays.

The displays 110_1 to 110_N may be configured to display information, and may include one display device or a combination of a plurality of display devices. For example, the display device may be a liquid crystal display (LCD), a field sequential color LCD, a light-emitting diode (LED) display, and an electrowetting display among other light-transmissive displays of a transmission mode, or may be a light-transmissive display of a projection mode.

The perception information capture devices 120_1 to 120_N may be configured to capture position information and posture information of a user. The perception information capture devices 120_1 to 120_N include a sensing device for capturing information of the user. In some embodiments, the perception information capture devices 120_1 to 120_N may include at least one image sensor or may include at least one image sensor combined with at least one depth sensor to capture image data toward a user located in front of the displays 110_1 to 110_N, so as to perform image identification and positioning on the user. The image sensor may be a visible light sensor or a non-visible light sensor, such as an infrared sensor. In addition, the perception information capture devices 120_1 to 120_N may also include an optical localizer to perform optical spatial localization on the user. In some embodiments, the perception information capture devices 120_1 to 120_N may also identify postures presented by the limbs, torso, and head of the user through various human posture identification technologies. For example, the perception information capture devices 120_1 to 120_N may identify feature points on the human skeleton and the human body according to the image data, so as to identify the posture of the user. For any devices or a combination thereof, that can locate the position information of the user and identify the posture information of the user, they all fall within the scope of the perception information capture devices 120_1 to 120_N.

In addition, the perception information capture devices 120_1 to 120_N may be configured to capture position information of a target in a physical scene. The perception information capture devices 120_1 to 120_N include a sensing device for capturing information of the target. In some embodiments, the perception information capture devices 120_1 to 120_N may include at least one image sensor or may include at least one image sensor combined with at least one depth sensor to capture image data toward a target located behind the displays 110_1 to 110_N, so as to perform image identification and positioning on the target. The image sensor may be a visible light sensor or a non-visible light sensor, such as an infrared sensor. For any devices or a combination thereof, that can locate the position information of the target, they all fall within the scope of the perception information capture devices 120_1 to 120_N.

In the embodiments of the disclosure, the image sensor may be configured to capture an image and includes a camera lens having a lens element and a photosensitive element. The depth sensor may be configured to detect depth information, and may be realized by active depth sensing technology and passive depth sensing technology. The active depth sensing technology may calculate depth information by actively emitting a light source, infrared, ultrasonic, laser, and so on to serve as a signal combined with time difference ranging technology. The passive depth sensing technology may calculate depth information by utilizing the parallax of two images captured from different viewing angles by two image sensors behind the images.

In some embodiments, the perception information capture devices 120_1 to 120_N may transmit information to the processing devices 130_1 to 130_N through respective communication interfaces by wire or wirelessly. The processing devices 130_1 to 130_N are computer devices with computing function. The processing devices 130_1 to 130_N may each include a processor. For example, the processor may be a central processing unit (CPU), an application processor (AP), or any other programmable general-purpose or special-purpose microprocessor, a digital signal processor (DSP), an image signal processor (ISP), a graphics processing unit (GPU), or other similar devices, integrated circuits, or a combination thereof. The processing devices 130_1 to 130_N may be deployed in the field to which the information display system 10 belongs, and may be computer devices respectively built into the displays 110_1 to 110_N or connected to the displays 110_1 to 110_N. The processing devices 130_1 to 130_N respectively correspond to the displays 110_1 to 110_N, and may be configured to control the displays 110_1 to 110_N connected thereto. For example, the processing device 130_1 may be configured to control the display 110_1 to display contents.

Figure 1B:
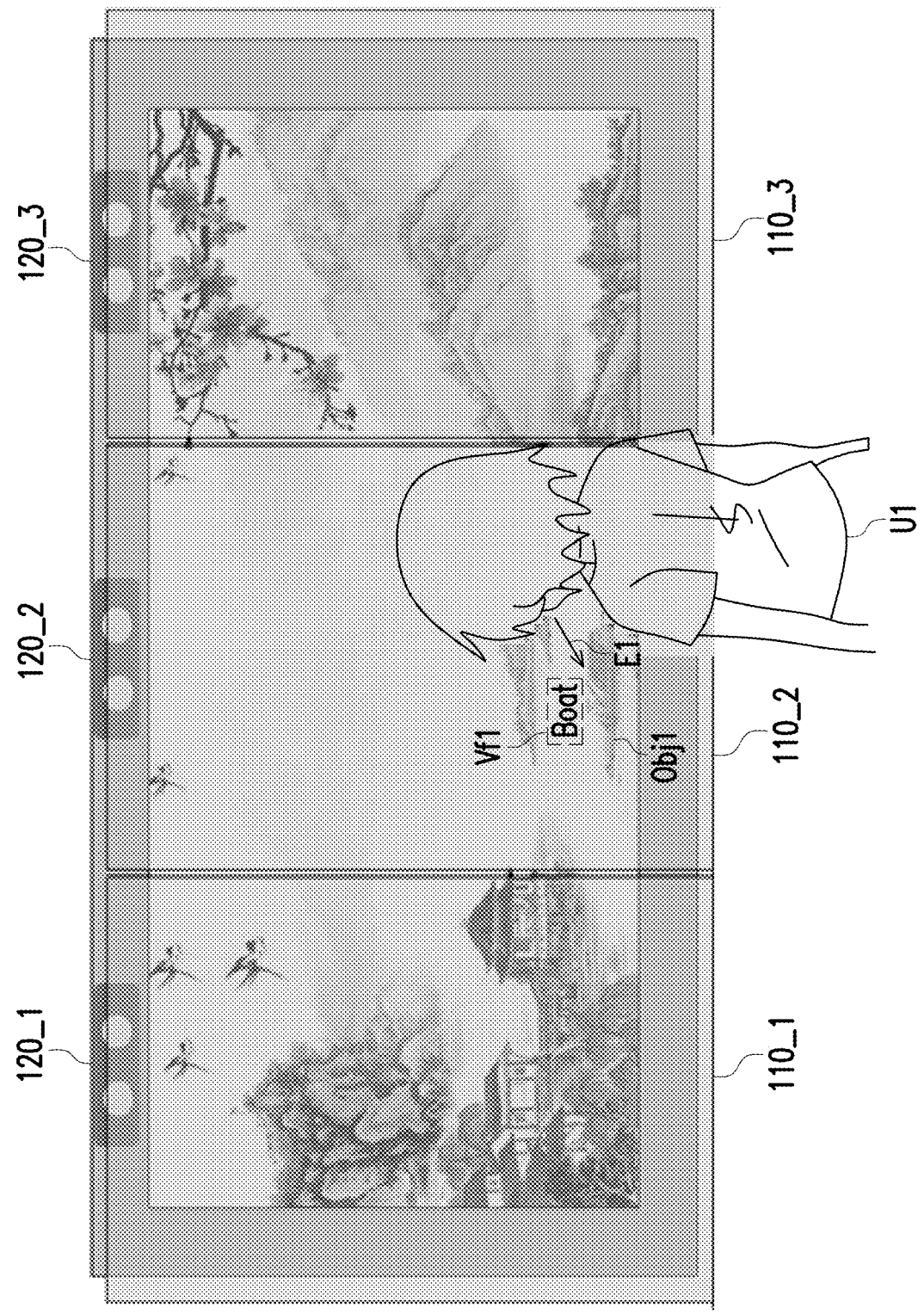
FIG. 1B is a schematic diagram of an information display system according to an exemplary embodiment of the disclosure.

For example, FIG. 1B is a schematic diagram of an information display system according to an exemplary embodiment of the disclosure. For convenience and clarity in description, three displays 110_1 to 110_3 and three perception information capture devices 120_1 to 120_3 are shown in FIG. 1B as an example for description, but the disclosure is not limited thereto. With reference to FIG. 1B, a user U1 and a target Obj1 are respectively located at the front side and the back side of the displays 110_1 to 110_3. In this exemplary embodiment, the user U1 may view a physical scene of a virtual object Vf1 including the target Obj1 through the display 110_2. The virtual object Vf1 may be regarded as augmented reality content augmented based on the target Obj1.

Note that the processing devices 130_1 to 130_N are connected to and communicate with each other through a plurality of gateways G1, G2, . . . , and Gk. Each of the gateways G1 to Gk supports wireless transmission protocols or wired transmission protocols, and may establish links with nearby gateways or the processing devices 130_1 to 130_N. The types of wireless transmission protocols and wired transmission protocols are not limited by the disclosure, and may be WiFi standards, ZigBee standards, mobile communication standards, Ethernet standards, or the like. In some embodiments, the gateways G1 to Gk may form a network topology N1. However, the disclosure does not limit the number of the gateways G1 to Gk and the form of the network topology. Each of the processing devices 130_1 to 130_N may be connected to at least one of the gateways G1 to Gk. With the links between the gateways G1 to Gk, the processing devices 130_1 to 130_N may transmit information and communicate with each other through the gateways G1 to Gk.

Note that, by configuring the links between the processing devices 130_1 to 130_N and the gateways G1 to Gk, the computing tasks required for displaying the virtual object Vf1 based on position information and posture information of the user U1 and position information of the target Obj1 may be distributed to and performed by some of the processing devices 130_1 to 130_N. Accordingly, computational efficiency may be improved through a distributed processing architecture to prevent delay in displaying the virtual object.

Figure 2:
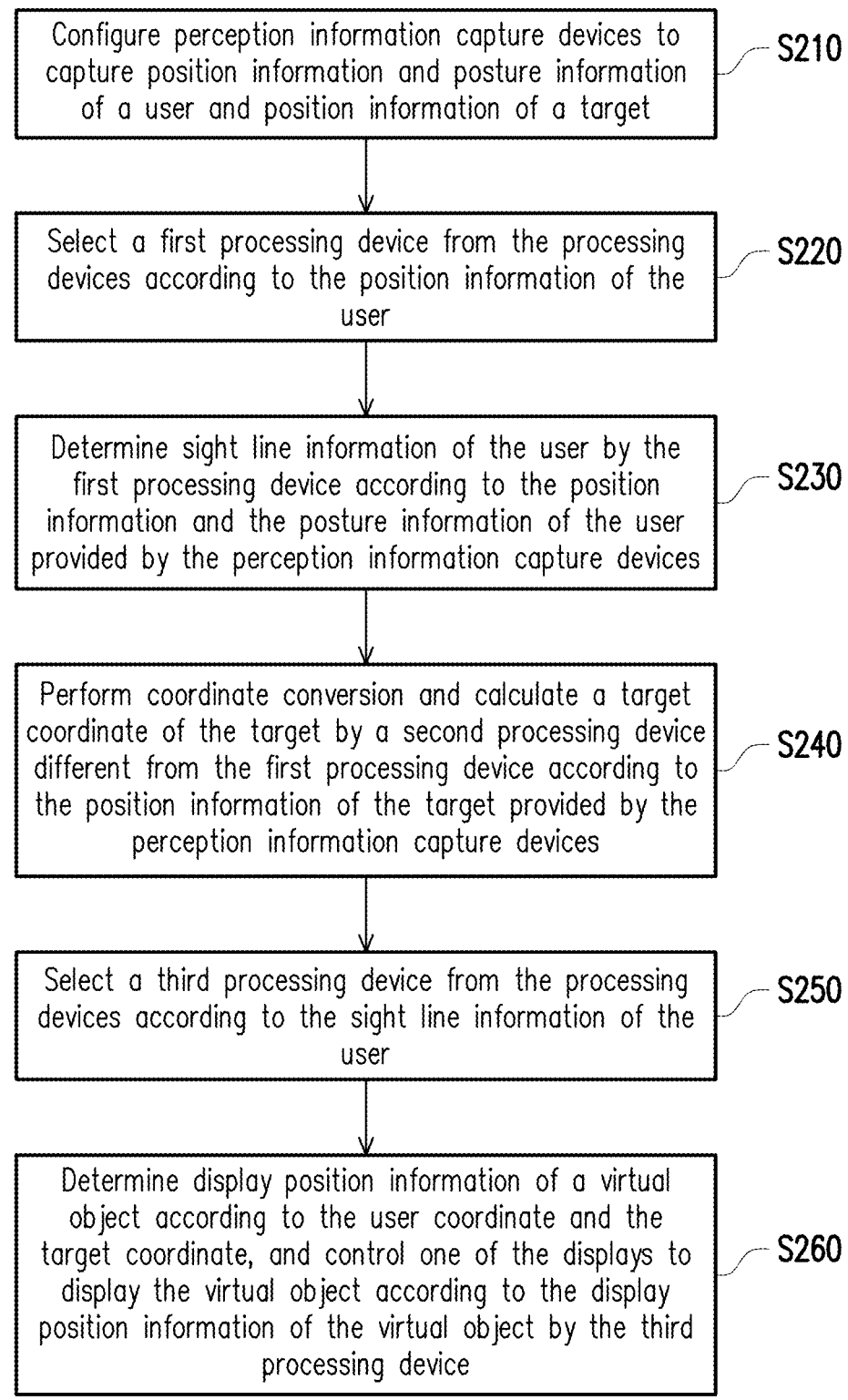
FIG. 2 is a flowchart of an information display method according to an exemplary embodiment of the disclosure.

FIG. 2 is a flowchart of an information display method according to an exemplary embodiment of the disclosure. With reference to FIG. 1A, FIG. 1B, and FIG. 2 together, flows of the method of FIG. 2 may be realized by the information display system 10 of FIG. 1A and FIG. 1B.

In step S210, the perception information capture devices 120_1 to 120_N are configured to capture the position information and the posture information of the user U1 and the position information of the target Obj1. As mentioned above, the perception information capture devices 120_1 to 120_N are, for example, image sensors, depth sensors, or a combination thereof that can locate the positions of the user U1 and the target Obj1.

In step S220, a first processing device is selected from the processing devices 130_1 to 130_N according to the position information of the user U1. In some embodiments, the first processing device is closest in distance to the position information of the user U1 among the processing devices 130_1 to 130_N. In other words, a distance between the first processing device and the user U1 is less than a distance between each of the other processing devices and the user U1. At least one of the perception information capture devices 120_1 to 120_N may locate the position information of the user U1. Moreover, in the case where the processing devices 130_1 to 130_N have been fixedly disposed in the field to which the information display system 10 belongs, position information of the processing devices 130_1 to 130_N is known. Therefore, at least one of the processing devices 130_1 to 130_N may obtain the distance between each of the processing devices 130_1 to 130_N and the user U1 according to the position information of the user U1 and the known position information of each of the processing devices 130_1 to 130_N. Accordingly, the first processing device that is closest in distance to the position information of the user U1 among the plurality of processing devices may be selected. As can be known, the first processing device that is closest in distance to the user U1 may correspondingly change in response to dynamic movement of the user U1.

In step S230, sight line information E1 of the user is determined by the first processing device according to the position information and the posture information of the user U1 provided by the perception information capture devices 120_1 to 120_N. After the first processing device is selected, the first processing device may obtain the position information and the posture information of the user directly from one of the perception information capture devices 120_1 to 120_N connected thereto, or may obtain the position information and the posture information of the user from the gateways G1 to Gk. Therefore, the first processing device may identify the sight line information E1 according to the position information and the posture information of the user U1. The sight line information E1 includes a sight line vector.

In step S240, by a second processing device different from the first processing device, coordinate conversion is performed and a target coordinate of the target Obj1 is calculated according to the position information of the target Obj1 provided by the perception information capture devices 120_1 to 120_N. In other words, the second processing device performs coordinate conversion on the position information (e.g., camera coordinates or image coordinates) of the target Obj1 provided by at least one of the perception information capture devices 120_1 to 120_N, and obtains the target coordinate in a three-dimensional display coordinate system.

In step S250, a third processing device is selected from the processing devices 130_1 to 130_N by the first processing device according to the sight line information E1 of the user U1. After the first processing device obtains the sight line information E1 of the user U1, the first processing device identifies one of the displays 110_1 to 110_N according to the sight line information E1 of the user U1 to select the corresponding third processing device from the processing devices 130_1 to 130_N according to one of the displays 110_1 to 110_N. In some embodiments, the first processing device may calculate a viewing angle range corresponding to one of the displays 110_1 to 110_N according to the position information of the user U1. The first processing device identifies the one of the displays 110_1 to 110_N from the displays 110_1 to 110_3 in response to the sight line information of the user U1 falling within the viewing angle range. Taking FIG. 1B as an example, the first processing device may calculate a viewing angle range corresponding to the display 110_2 according to the position information of the user U1. Since the sight line information of the user U1 falls within the viewing angle range of the display 110_2, it may be determined that the sight line position of the user U1 falls on the display 110_2.

In other words, the first processing device may identify the display looked at by the user according to the sight line information E1 of the user U1. Since the displays 110_1 to 110_N may be respectively controlled by the corresponding processing devices 130_1 to 130_N, the first processing device may select the processing device corresponding to the display looked at by the user as the third processing device. Note that the first processing device may be the same as or different from the third processing device. In the scenario where the displays 110_1 to 110_N are arranged in parallel and the processing devices 130_1 to 130_N are respectively disposed adjacent to the corresponding displays 110_1 to 110_N, the first processing device closest in distance to the user U1 is the same as the third processing device looked at by the user U1 when the user looks at the display directly in front of the user; and the first processing device closest in distance to the user U1 is different from the third processing device looked at by the user U1 when the user looks at the displays at the left and right sides.

In some embodiments, the third processing device performs coordinate conversion and calculates a user coordinate of the user according to the position information of the user U1 provided by the perception information capture devices 120_1 to 120_N. In other words, the third processing device performs coordinate conversion on the position information (e.g., camera coordinates or image coordinates) of the user U1 provided by at least one of the perception information capture devices 120_1 to 120_N, and obtains the user coordinate in a three-dimensional display coordinate system.

In step S260, by the third processing device, display position information of the virtual object Vf1 is determined according to the user coordinate and the target coordinate, and one of the displays 110_1 to 110_N is controlled to display the virtual object Vf1 according to the display position information of the virtual object Vf1. In some embodiments, the second processing device may transmit the target coordinate of the target Obj1 to the third processing device through the gateways G1 to Gk. Similarly, if the first processing device is different from the third processing device, the first processing device may also transmit the sight line information E1 of the user U1 to the third processing device through the gateways G1 to Gk. Based on this, the third processing device may determine the display position information of the virtual object Vf1 according to the user coordinate, the sight line information E1, and the target coordinate. The display position information may be regarded as a landing point or region where the sight line of the user is pointed on the display plane when the user views the target Obj1. Depending on various requirements or different applications, the third processing device may determine the actual display position of the virtual object Vf1 according to the display position information for the user U1 to see the virtual object Vf1 displayed near the target Obj1 or see the virtual object Vf1 displayed to be superimposed on the target Obj1.

As can be known accordingly, in the embodiment of the disclosure, by linking the gateways G1 to Gk with the processing devices 130_1 to 130_N, the amount of computation required for displaying the virtual object Vf1 may be allocated to be in the charge of a plurality of processing devices to improve computational efficiency and prevent delay in displaying the virtual object.

Embodiments accompanied with the display system 10 will be provided below to describe the implementations of the disclosure to determine the third processing device according to the sight line information of a single user and multiple users. For convenience and clarity in description in the following embodiments, three processing devices 130_1 to 130_3 respectively connected to three displays 110_1 to 110_3 and three perception information capture devices 120_1 to 120_3 will be taken as an example, but the disclosure is not limited thereto. The processing devices 130_1 to 130_3 may be respectively disposed adjacent to the corresponding displays 110_1 to 110_3.

Figure 3A:
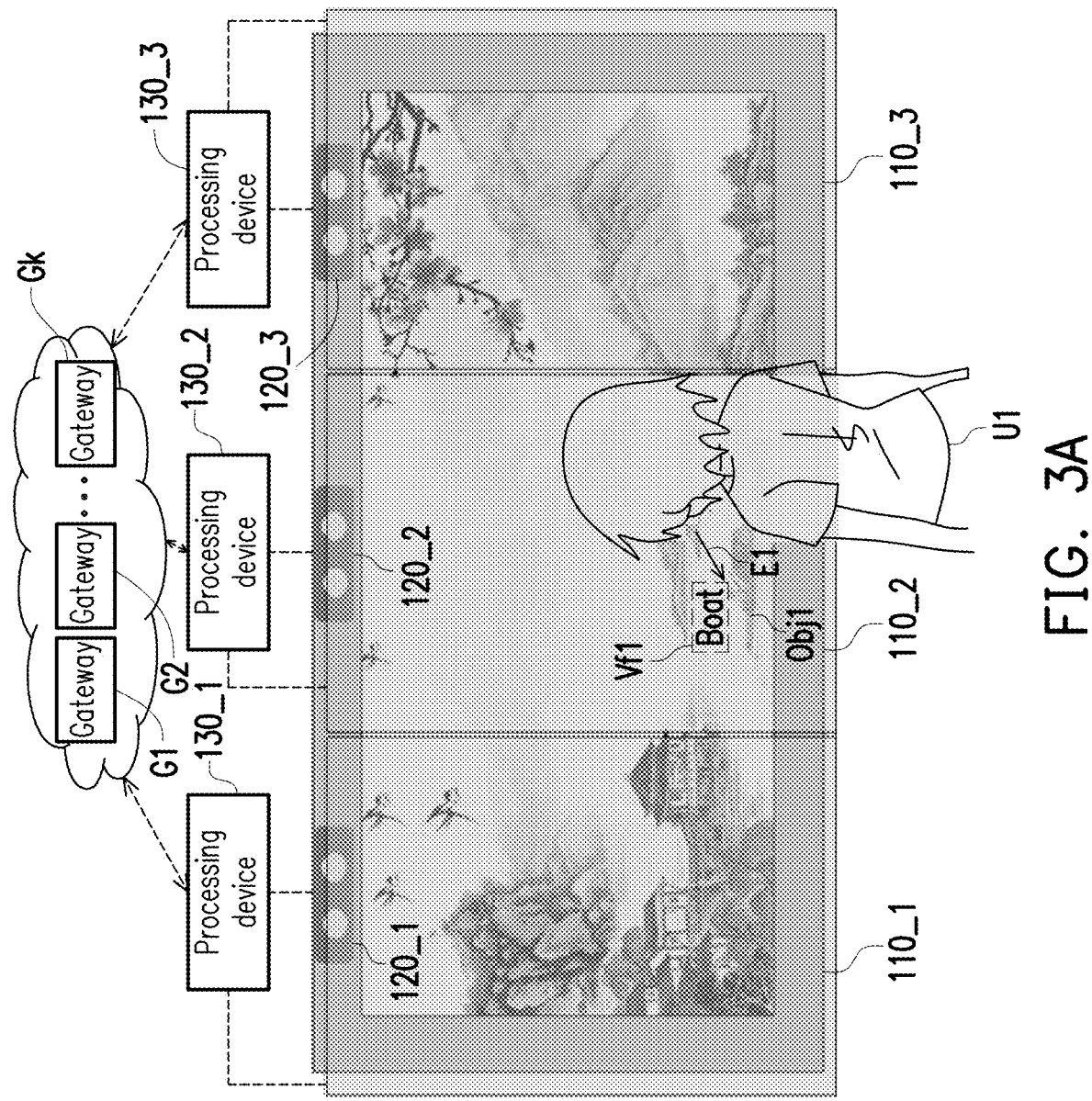
FIG. 3A is a schematic diagram of an application scenario of an information display system according to an exemplary embodiment of the disclosure.
Figure 3B:
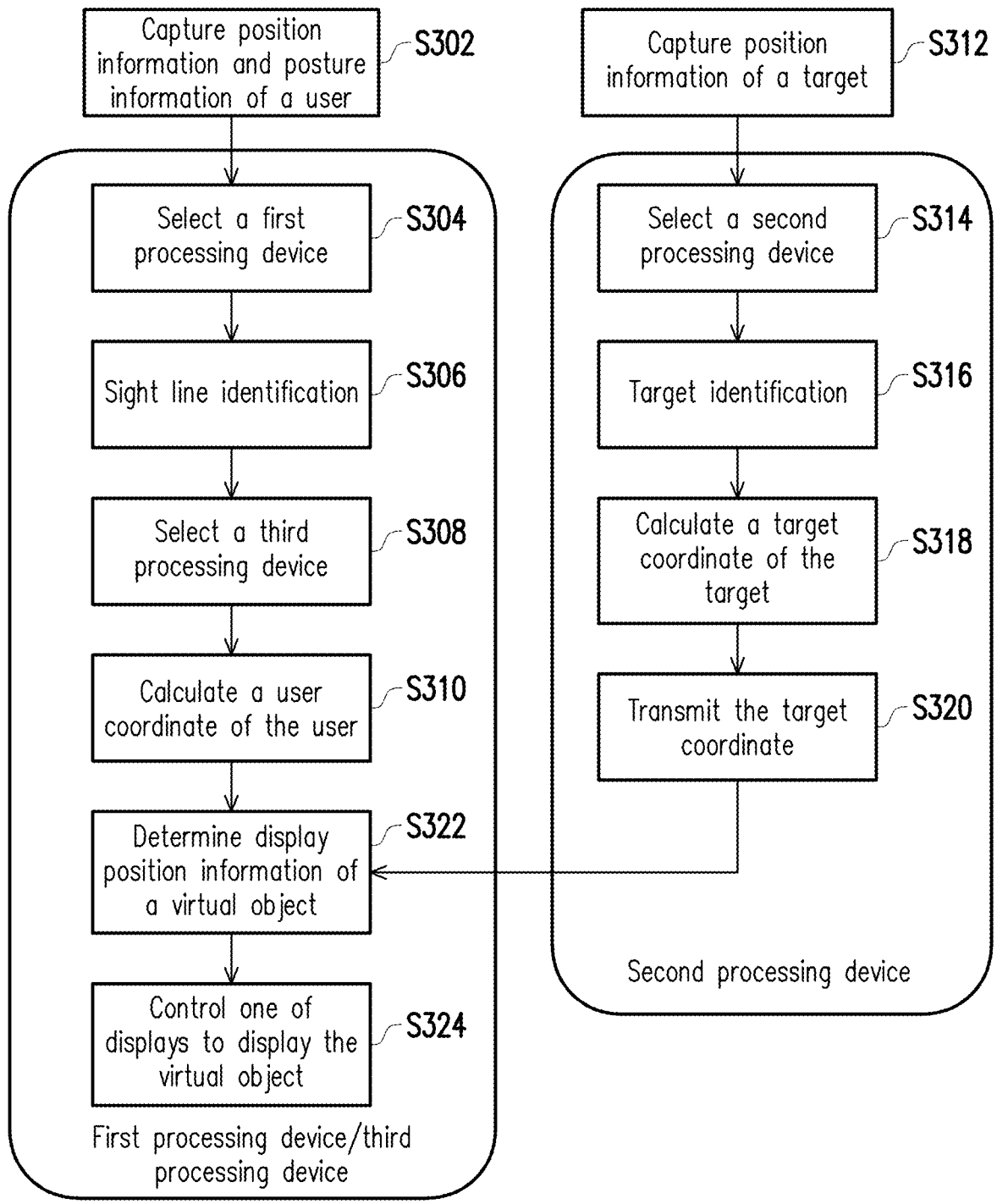
FIG. 3B is a flowchart of an information display method according to an exemplary embodiment of the disclosure.

FIG. 3A is a schematic diagram of an application scenario of an information display system according to an exemplary embodiment of the disclosure. FIG. 3B is a flowchart of an information display method according to an exemplary embodiment of the disclosure. With reference to FIG. 3A and FIG. 3B together, in this embodiment, the user U1 is in front of the display 110_2 and looks at the display 110_2 directly in front of the user U1.

The perception information capture device 120_2 may capture position information and posture information of the user U1 (step S302), and transmit the position information and the posture information of the user U1 to the processing device 130_2, for example. In response to receiving the position information of the user U1, the processing device 130_2 may calculate a distance between each of the processing devices 130_1 to 130_3 and the position information of the user U1. Moreover, the processing device 130_2 may select a first processing device according to the distance between each of the processing devices 130_1 to 130_3 and the position information of the user U1 (step S304). Here, the first processing device is closest in distance to the position information of the user U1 among the processing devices 130_1 to 130_3. In this exemplary embodiment, it is assumed that the processing device 130_2 is the first processing device closest in distance to the user U1. In other words, in an embodiment, by the perception information capture device 120_2, the processing device 130_2 may determine that the distance between the processing device 130_2 and the user U1 is less than the distance between each of the other processing devices 130_1 and 130_3 and the user U1.

Next, the processing device 130_2 may identify the sight line information E1 of the user U1 according to the position information and the posture information of the user U1 (step S306). The processing device 130_2 is selected to calculate the sight line information E1 of the user U1 and determine on which display the sight line information E1 of the user U1 falls. In this exemplary embodiment, the processing device 130_2 may determine that the sight line information E1 of the user U1 falls on the display 110_2 according to the sight line information E1 of the user U1 and select a third processing device according to the display 110_2 to which the sight line information E1 is pointed (step S308). In this exemplary embodiment, the processing device 130_2 for controlling the display 110_2 is the third processing device. In other words, the first processing device and the third processing device in this exemplary embodiment are the same and both are the processing device 130_2. Therefore, the processing device 130_2 performs coordinate conversion and calculates a user coordinate of the user according to the position information of the user U1 provided by the perception information capture device 120_2 (step S310).

In addition, the perception information capture devices 120_1 to 120_3 may capture position information of the target Obj1 (step S312). Since the processing device 130_2 has been selected as the first processing device, the processing device 130_1 or the processing device 130_3 may be selected as a second processing device (step S314). The processing device 130_3 as the second processing device will be taken as an example in the description below. The processing device 130_3 may receive the position information and other relevant information of the target Obj1 to further process target identification related to the target Obj1 (step S316). Next, the processing device 130_3 performs coordinate conversion and calculates a target coordinate of the target Obj1 according to the position information of the target Obj1 provided by the perception information capture devices 120_1 to 120_3 (step S318), to convert the position information of the user U1 and the position information of the target Obj1 into the same coordinate system. The processing device 130_3 may transmit the target coordinate of the target Obj1 through at least one of the gateways G1 to Gk to the processing device 130_2 as the third processing device (step S320).

Lastly, the processing device 130_2 determines display position information of the virtual object Vf1 according to the user coordinate and the target coordinate (step S322), and controls the display 110_2 to display the virtual object according to the display position information of the virtual object (step S324). Accordingly, the processing device 130_2 may display the virtual object Vf1 taking the display position information as a reference.

Figure 4A:
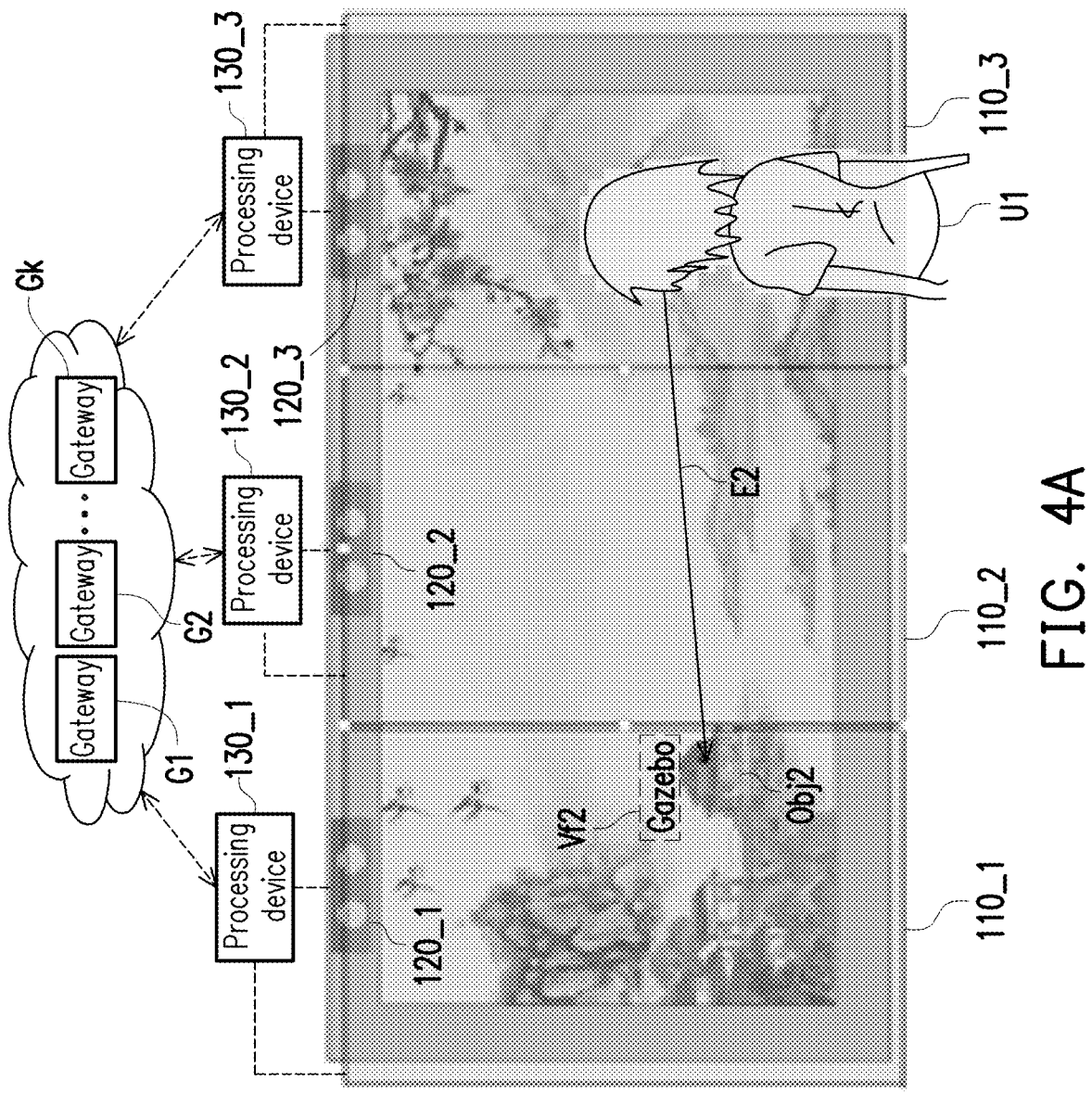
FIG. 4A is a schematic diagram of an application scenario of an information display system according to an exemplary embodiment of the disclosure.
Figure 4B:
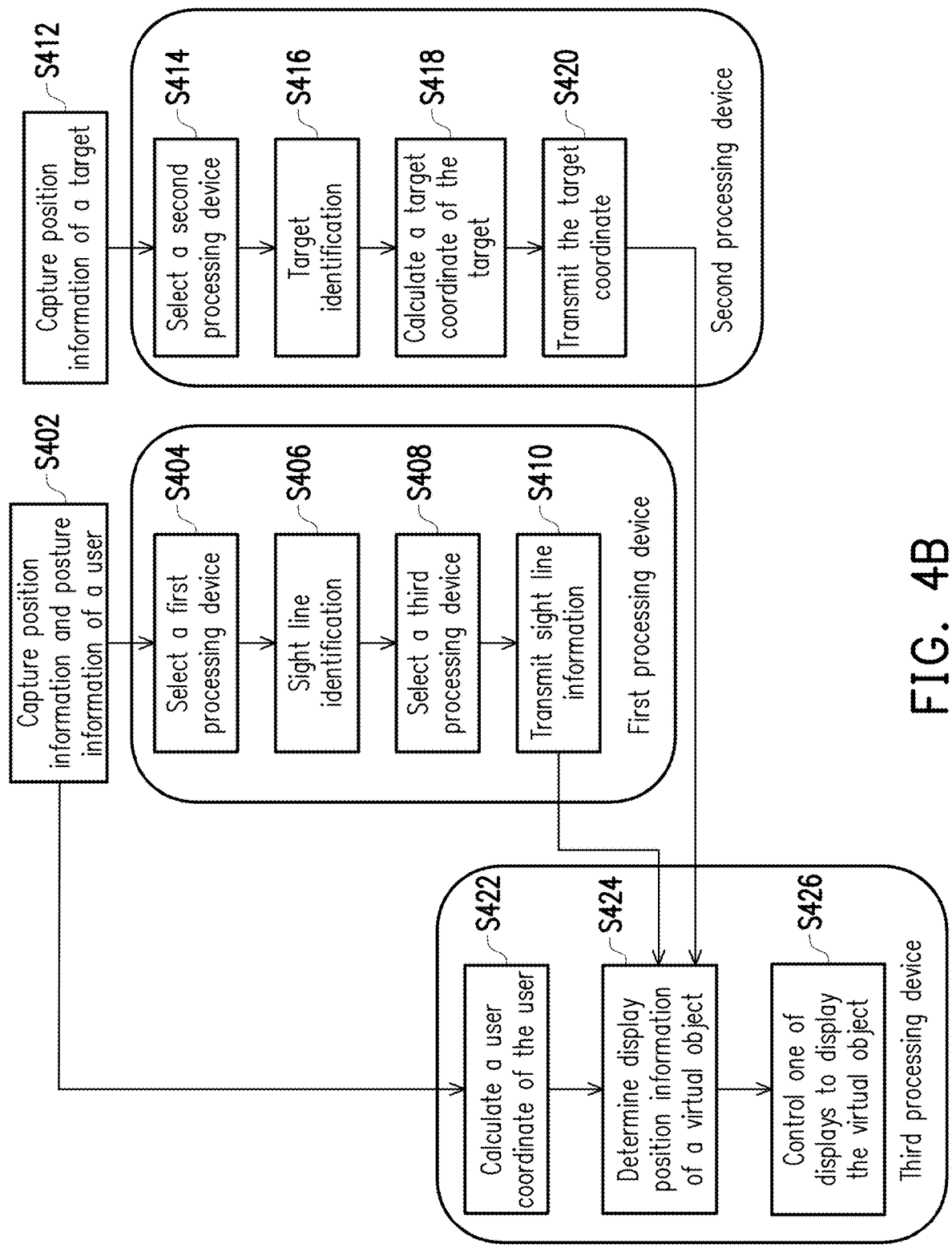
FIG. 4B is a flowchart of an information display method according to an exemplary embodiment of the disclosure.

FIG. 4A is a schematic diagram of an application scenario of an information display system according to an exemplary embodiment of the disclosure. FIG. 4B is a flowchart of an information display method according to an exemplary embodiment of the disclosure. With reference to FIG. 4A and FIG. 4B together, in this embodiment, the user U1 is in front of the display 110_3 and looks at the display 110_1 located to the left of the user U1.

The perception information capture device 120_3 may capture position information and posture information of the user U1 (step S402), and transmit the position information and the posture information of the user U1 to the processing device 130_3, for example. The processing device 130_3 may select a first processing device according to a distance between each of the processing devices 130_1 to 130_3 and the position information of the user U1 (step S404). In this exemplary embodiment, the first processing device is the processing device 130_3 that is closest in distance to the position information of the user U1 among the processing devices 130_1 to 130_3. Next, the processing device 130_3 as the first processing device may identify sight line information E2 of the user U1 according to the position information and the posture information of the user U1 (step S406). In this exemplary embodiment, the processing device 130_3 may determine that the sight line information E2 of the user U1 falls on the display 110_1 according to the sight line information E2 of the user U1 and select a third processing device according to the display 110_1 to which the sight line information E2 is pointed (step S408). In this exemplary embodiment, the processing device 130_1 for controlling the display 110_1 is the third processing device. In other words, the first processing device and the third processing device are different in this exemplary embodiment. The processing device 130_3 may transmit the sight line information E2 of the user U1 through at least one of the gateways G1 to Gk to the processing device 130_1 as the third processing device (step S410).

In addition, the perception information capture devices 120_1 to 120_3 may capture position information of a target Obj2 (step S412). Since the processing device 130_3 has been selected as the first processing device and the processing device 130_1 has been selected as the third processing device, the processing device 130_2 may be selected as a second processing device (step S414). The processing device 130_2 may receive the position information and other relevant information of the target Obj2 to further process target identification related to the target Obj2 (step S416). Next, the processing device 130_2 performs coordinate conversion and calculates a target coordinate of the target Obj2 according to the position information of the target Obj2 provided by the perception information capture devices 120_1 to 120_3 (step S418). The processing device 130_2 may transmit the target coordinate of the target Obj2 through at least one of the gateways G1 to Gk to the processing device 130_1 as the third processing device (step S420).

The processing device 130_1 may receive the position information of the user U1 through the gateways G1 to Gk or directly from the perception information capture device 120_1. Therefore, the processing device 130_1 performs coordinate conversion and calculates a user coordinate of the user according to the position information of the user U1 (step S422). The processing device 130_1 determines display position information of a virtual object Vf2 according to the user coordinate, the target coordinate, and the sight line information E2 (step S424), and controls the display 110_1 to display the virtual object Vf2 according to the display position information of the virtual object Vf2 (step S426). In this exemplary embodiment, the processing device 130_3 (i.e., the first processing device) may analyze the sight line information E2 of the user U1. The processing device 130_2 (i.e., the second processing device) may process object identification and coordinate conversion on the target Obj2. The processing device 130_1 (i.e., the third processing device) determines the display position information of the virtual object Vf2 according to the user coordinate and the target coordinate.

In some embodiments, the first processing device may calculate a viewing angle range corresponding to a certain display according to the position information of the user U1.

The first processing device may identify the display looked at by the user U1 from the displays 110_1 to 110_3 in response to the sight line information of the user U1 falling within the viewing angle range.

Figure 5A:
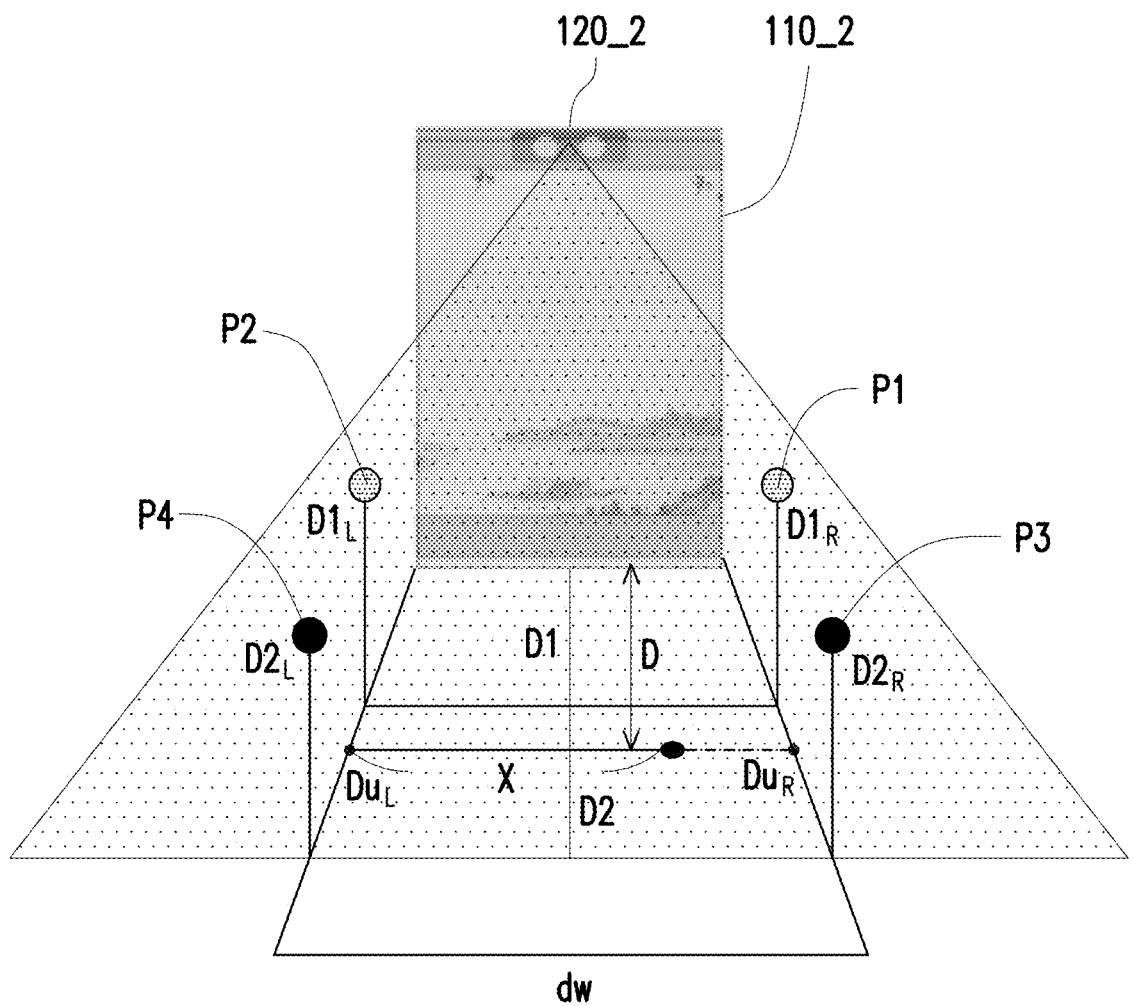
FIG. 5A and FIG. 5B are schematic diagrams of estimating a sight line position according to an exemplary embodiment of the disclosure.
Figure 5B:
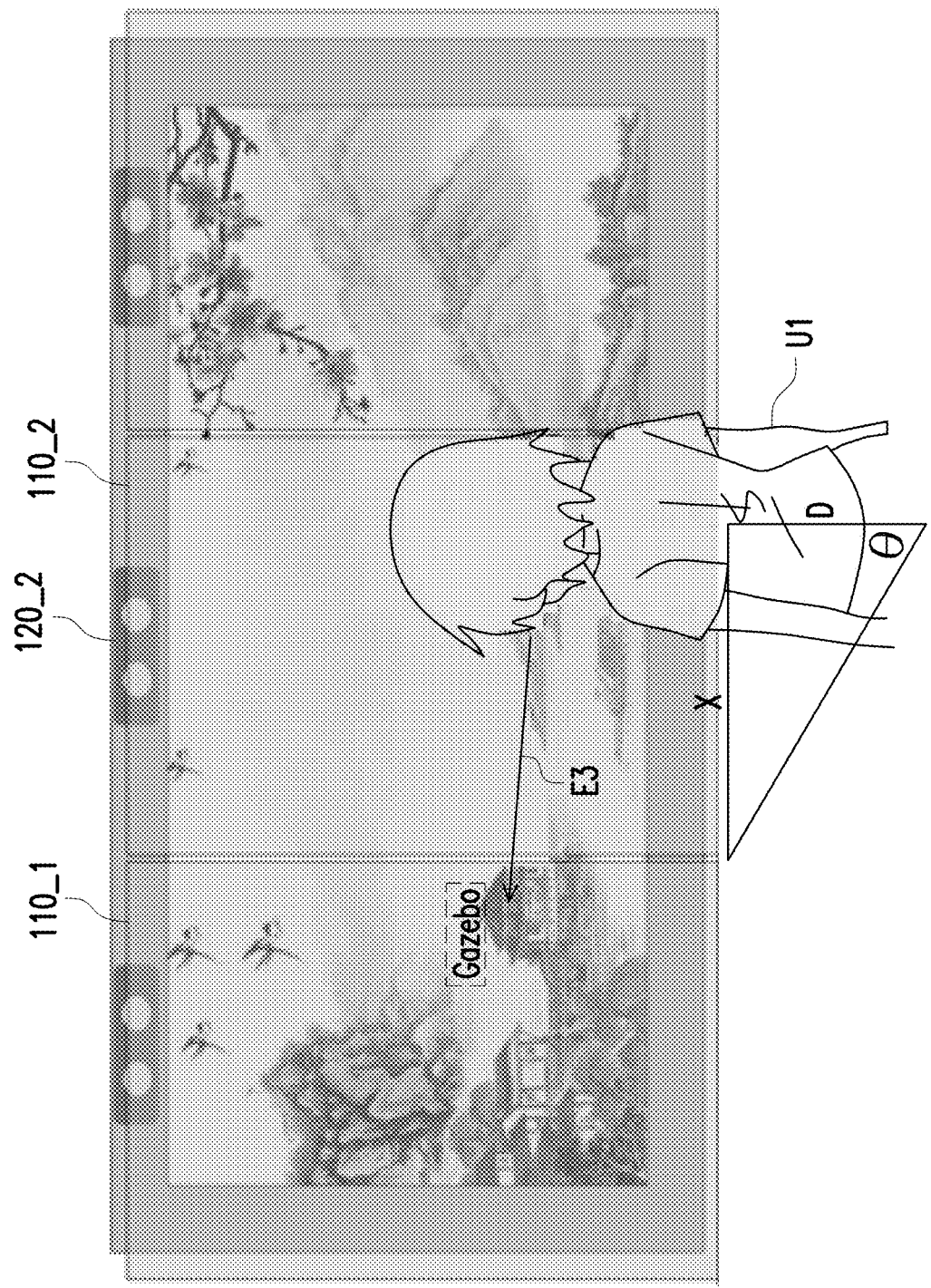

FIG. 5A and FIG. 5B are schematic diagrams of estimating a sight line position according to an exemplary embodiment of the disclosure. With reference to FIG. 5A and FIG. a width of the display 110_2 is dw. By disposing reference points P1 to P4 at known positions in front of the display 110_2, the processing device 130_2 may estimate a lateral offset distance X of the user U1 from the left border of the display 110_2 according to pixel positions of the reference points P1 to P4 on an image captured by the perception information capture device 120_2. The reference points P1 to P4 may be any identifier and is not limited by the disclosure.

Depth information of the reference points P1 to P2 is D1, and depth information of the reference points P3 to P4 is D2. The ratio of the result of subtracting an X-axis pixel coordinate $D1_L$ of the reference point P2 from an X-axis pixel coordinate $D1_R$ of the reference point P1 to the depth information D1 will be equal to the ratio of the result of subtracting an X-axis pixel coordinate $Du_L$ from an X-axis pixel coordinate $Du_R$ to depth information D. Similarly, the ratio of the result of subtracting an X-axis pixel coordinate $D2_L$ of the reference point P4 from an X-axis pixel coordinate $D2_R$ of the reference point P3 to the depth information D2 will be equal to the ratio of the result of subtracting the X-axis pixel coordinate $Du_L$ from the X-axis pixel coordinate $Du_R$ to the depth information D. Based on this, in the case where the X-axis pixel coordinate $Du_R$ and the X-axis pixel coordinate $Du_L$ can be known by calculation, the lateral offset distance X of the user U1 from the left border of the display 110_2 can be obtained by, for example, interpolation calculation based on the depth information D of the user and the width dw.

As such, a viewing angle range θ may be calculated based on the lateral offset distance X, the depth information D, and the tangent function. As shown in FIG. 5B, if sight line information E3 of the user U1 does not fall within the viewing angle range θ, it indicates that the user U1 looks at the display 110_1 to the left. Comparatively, if the sight line information of the user U1 falls within the viewing angle range θ, it indicates that the user U1 looks at the display 110_2.

Figure 6A:
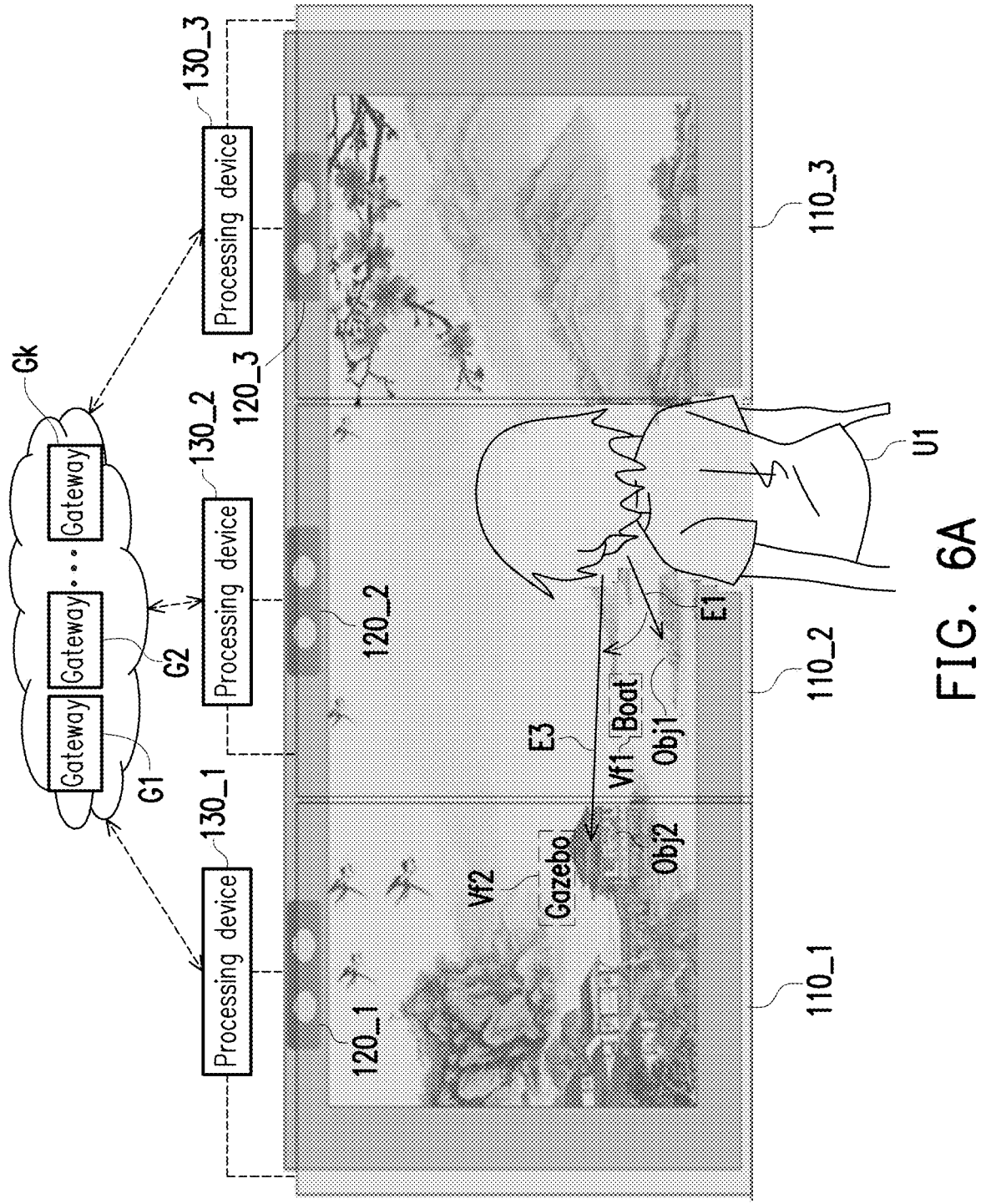
FIG. 6A is a schematic diagram of an application scenario of an information display system according to an exemplary embodiment of the disclosure.
Figure 6B:
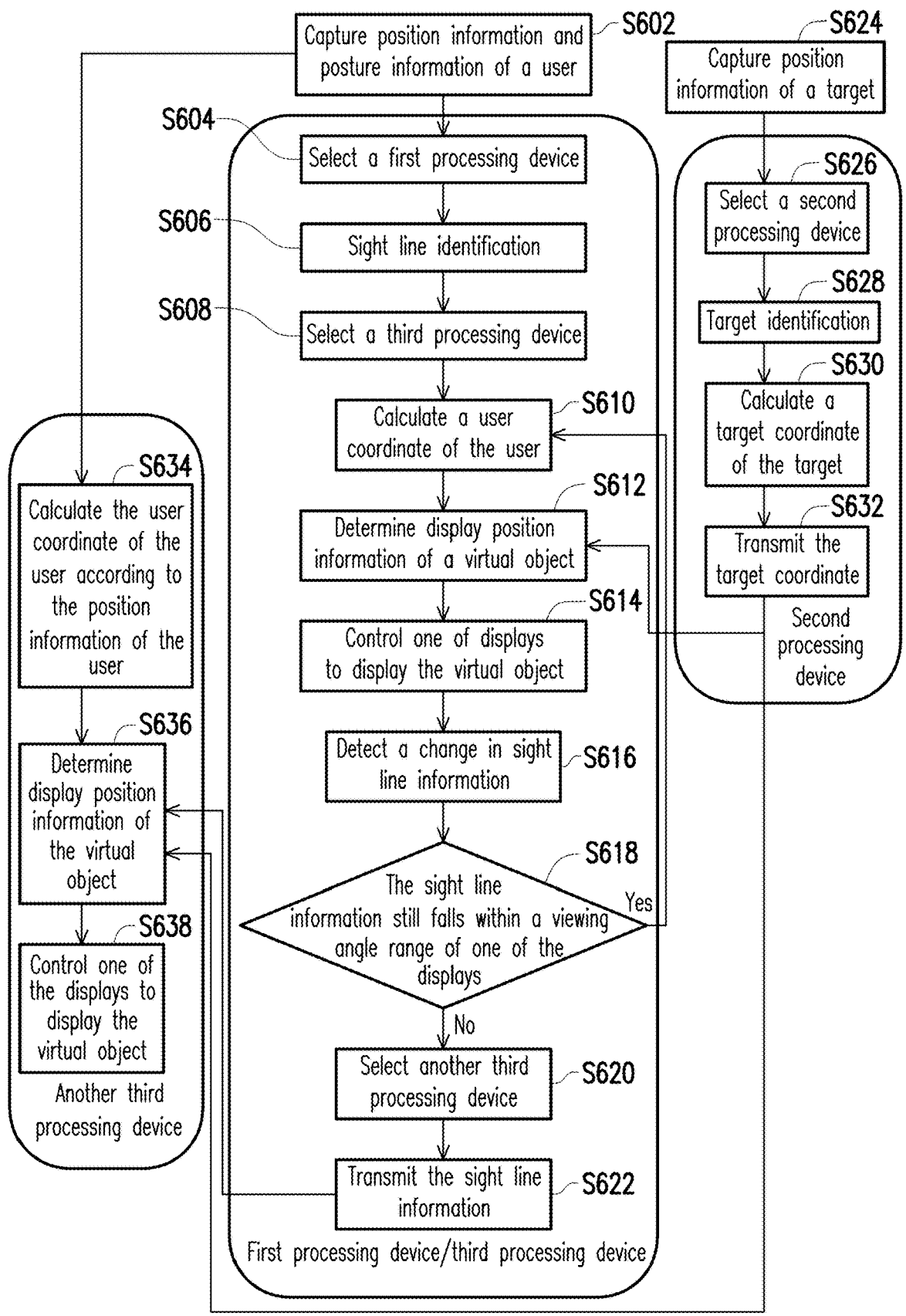
FIG. 6B is a flowchart of an information display method according to an exemplary embodiment of the disclosure.

FIG. 6A is a schematic diagram of an application scenario of an information display system according to an exemplary embodiment of the disclosure. FIG. 6B is a flowchart of an information display method according to an exemplary embodiment of the disclosure. With reference to FIG. 6A and FIG. 6B together, in this embodiment, the user U1 is located in front of the display 110_2, and switches from looking at the display 110_2 located directly in front of the user U1 to looking at the display 110_1 located to the left of the user U1.

The perception information capture device 120_2 may capture position information and posture information of the user U1 (step S602), and transmit the position information and the posture information of the user U1 to the processing device 130_2, for example. The processing device 130_2 may select a first processing device according to a distance between each of the processing devices 130_1 to 130_3 and the position information of the user U1 (step S604). In this exemplary embodiment, the first processing device may be the processing device 130_2 that is closest in distance to the position information of the user U1 among the processing devices 130_1 to 130_3. Next, the processing device 130_2 as the first processing device may identify the sight line information E1 of the user U1 according to the position information and the posture information of the user U1 (step S606). In this exemplary embodiment, the processing device 130_2 may determine that the sight line information E1 of the user U1 falls on the display 110_2 according to the sight line information E1 of the user U1 and select a third processing device according to the display 110_1 to which the sight line information E1 is pointed (step S608). In this exemplary embodiment, before the sight line information of the user U1 is changed, the processing device 130_2 for controlling the display 110_2 is also the third processing device. Therefore, the processing device 130_2 calculates a user coordinate of the user (step S610). The processing device 130_2 determines display position information of the virtual object Vf1 (step S612). The processing device 130_2 controls the display 110_2 to display the virtual object Vf1 (step S614). The detailed operation specifics of step S602 to step S614 have been described in detail in the embodiments above, and will not be repeatedly described here.

Note that, in response to the user U1 turning around or turning his head, the processing device 130_2 detects a change in sight line information of the user U1 (step S616). In this exemplary embodiment, the sight line information E1 of the user is changed to the sight line information E3. After the sight line information of the user U1 is changed, the processing device 130_2 determines whether the sight line information E3 of the user U1 still falls within a viewing angle range of one (i.e., the display 110_2) of the displays 110_1 to 110_3 (step S618). In response to the sight line information E3 of the user U1 not falling within the viewing angle range of the display 110_2 (determined to be No in step S618), the processing device 130_2 identifies another one (i.e., the display 110_1) of the displays 110_1 to 110_3 according to the sight line information E3 of the user to select another third processing device from the processing devices 130_1 to 130_3 according to the another one (i.e., the display 110_1) of the displays 110_1 to 110_3 (step S620). In this exemplary embodiment, after the sight line information of the user U1 is changed, the processing device 130_1 for controlling the display 110_1 is identified as another third processing device. Therefore, the processing device 130_2 transmits the sight line information E3 to the processing device 130_1 that is subsequently in charge of display control (step S622).

In addition, the perception information capture devices 120_1 to 120_3 may capture position information of the targets Obj1 and Obj2 (step S624). Since the processing device 130_2 has been selected as the first processing device, the processing device 130_3 may be selected as a second processing device (step S626). The processing device 130_3 may receive the position information and other relevant information of the targets Obj1 and Obj2 to further process target identification related to the targets Obj1 and Obj2 (step S628). Next, the processing device 130_3 performs coordinate conversion and calculates target coordinates of the targets Obj1 and Obj2 according to the position information of the targets Obj1 and Obj2 provided by the perception information capture devices 120_1 to 120_3 (step S630). The processing device 130_3 may transmit the target coordinates of the targets Obj1 and Obj2 through at least one of the gateways G1 to Gk to the processing device 130_1 and the processing device 130_2 as the third processing devices (step S632).

Similar to the principle of operation above, the processing device 130_1 performs coordinate conversion and calculates the user coordinate of the user according to the position information of the user U1 (step S634). The processing device 130_1 determines display position information of the virtual object Vf2 according to the user coordinate, the target coordinate, and the sight line information E3 (step S636), and controls the display 110_1 to display the virtual object Vf2 according to the display position information of the virtual object Vf2 (step S638). In this exemplary embodiment, the third processing device in charge of display control is switched from the processing device 130_2 to the processing device 130_1 in response to a change in the sight line.

Figure 7:
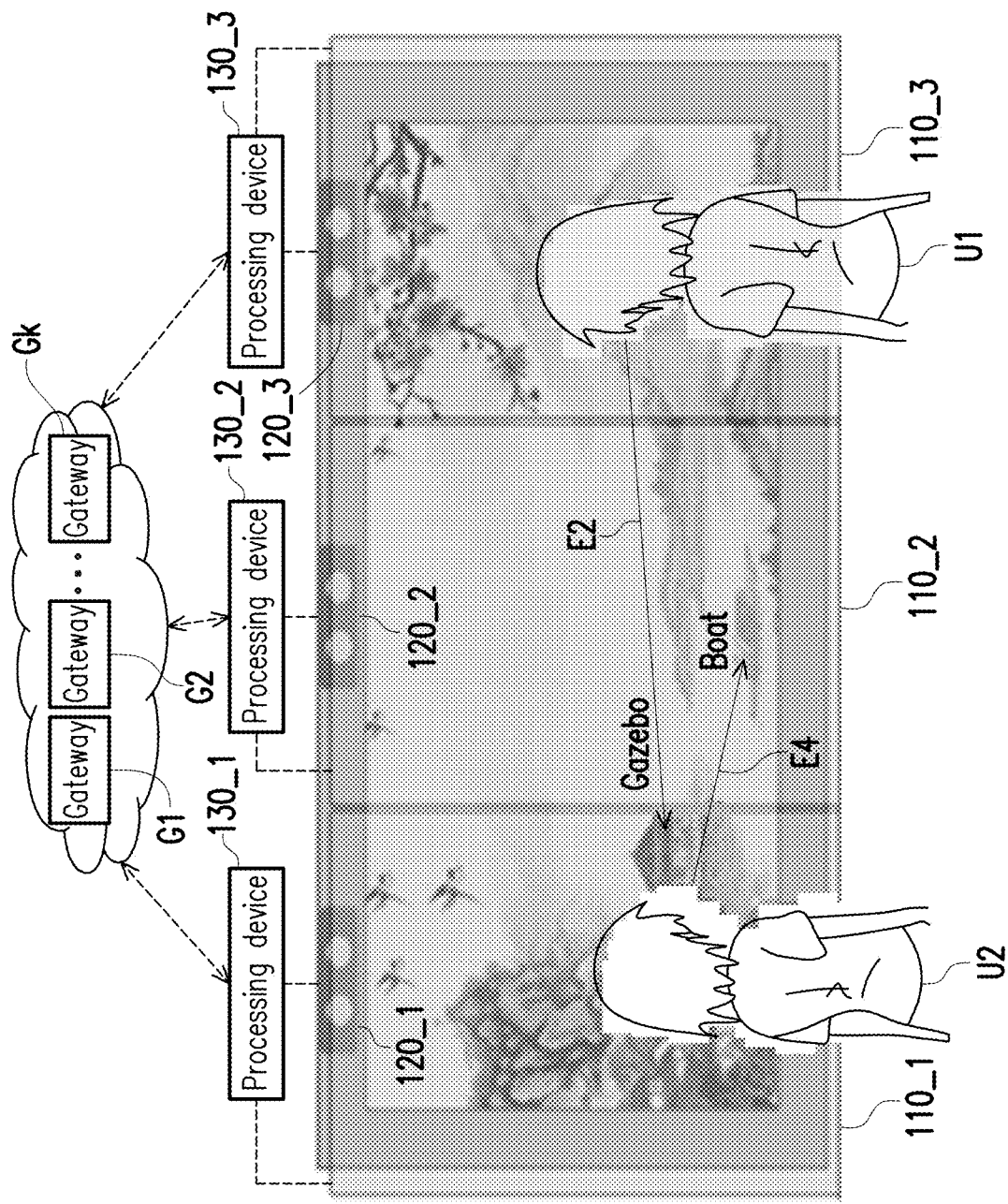
FIG. 7 is a schematic diagram of an application scenario of an information display system according to an exemplary embodiment of the disclosure.

FIG. 7 is a schematic diagram of an application scenario of an information display system according to an exemplary embodiment of the disclosure. With reference to FIG. 7, when the number of users exceeds one person, two of the processing devices 130_1 to 130_3 may serve as first processing devices for calculating the sight line information E2 and sight line information E4. In the exemplary embodiment of FIG. 7, since the perception information capture device 120_1 detects a user U2, the processing device 130_1 that is closest in distance to the user U2 is selected as the first processing device for calculating the sight line information E4 of the user U2. In addition, since the perception information capture device 120_1 detects the user U1, the processing device 130_3 that is closest in distance to the user U1 is selected as the first processing device for calculating the sight line information E2 of the user U1. In addition, the processing devices 130_1 and 130_2 may be respectively configured to calculate display position information of the virtual objects Vf1 and Vf2 according to the sight line positions of the sight line information E2 and E4 of the users U1 and U2 pointed on the displays 110_1 and 110_2.

Figure 8A:
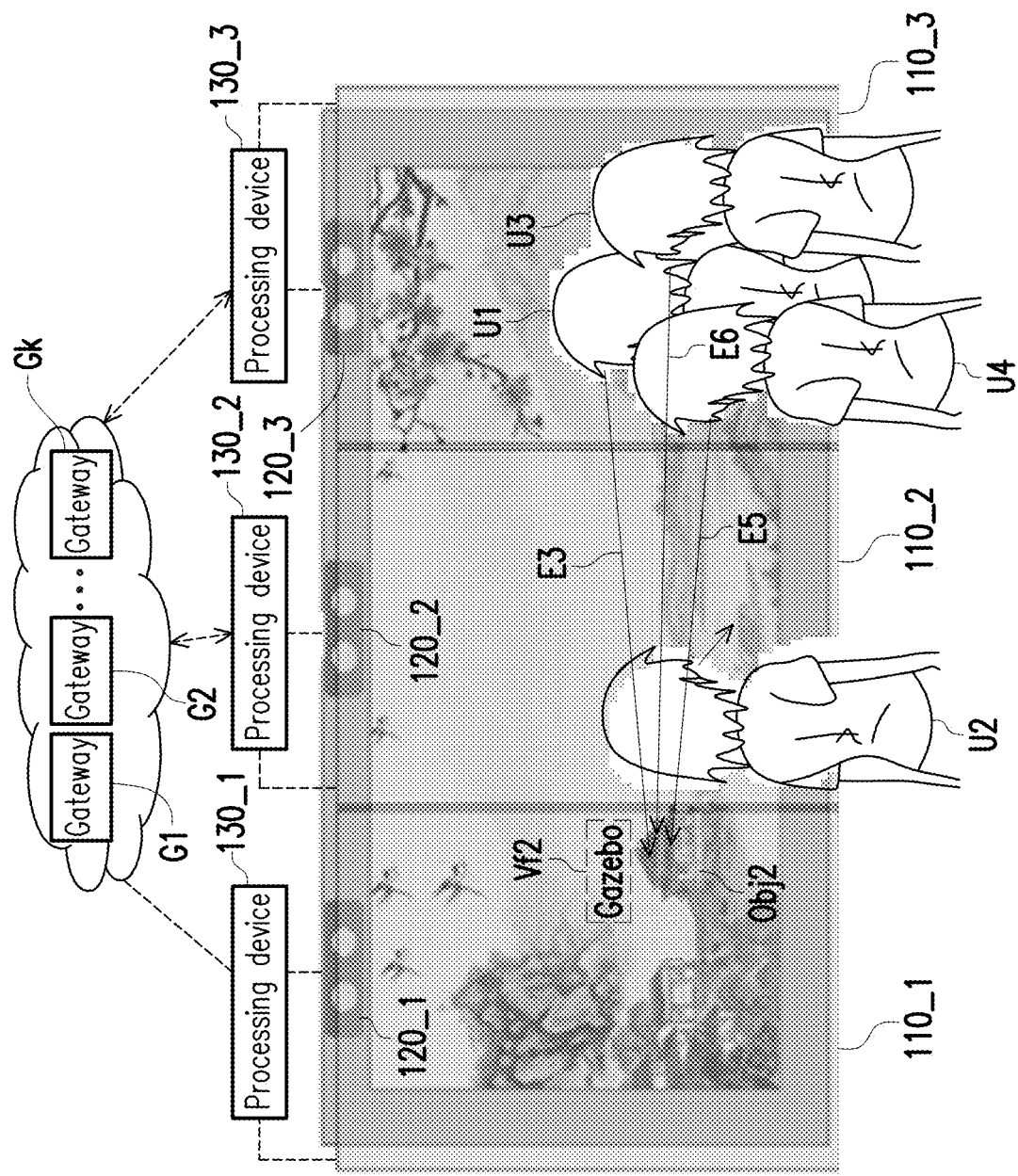
FIG. 8A is a schematic diagram of an application scenario of an information display system according to an exemplary embodiment of the disclosure.
Figure 8B:
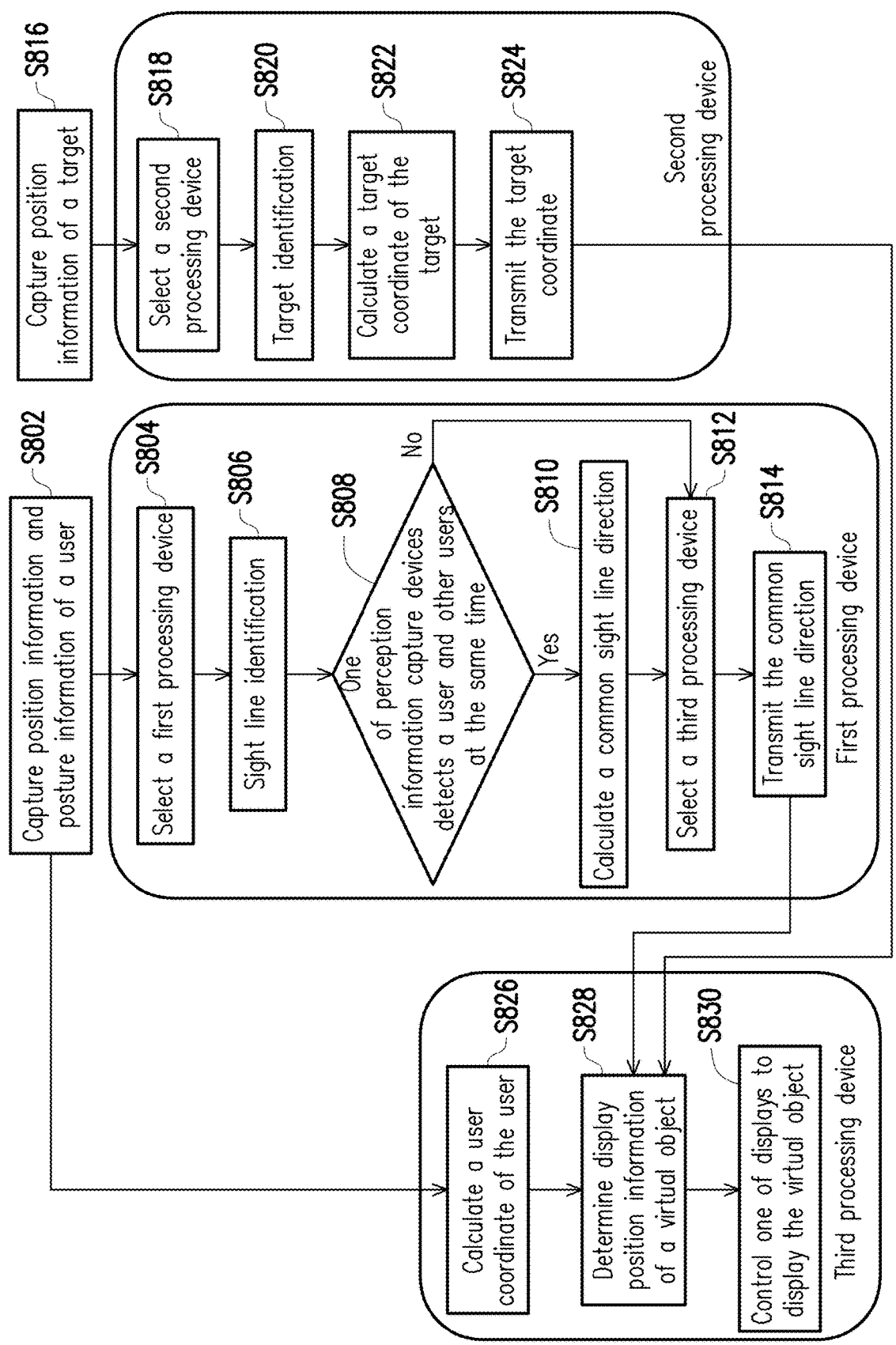
FIG. 8B is a flowchart of an information display method according to an exemplary embodiment of the disclosure.

FIG. 8A is a schematic diagram of an application scenario of an information display system according to an exemplary embodiment of the disclosure. FIG. 8B is a flowchart of an information display method according to an exemplary embodiment of the disclosure. With reference to FIG. 8A and FIG. 8B together, in this embodiment, the user U1 and a plurality of other users U3 and U4 are located in front of the display 110_3, and the user U1 and the other users U3 and U4 all look at the display 110_1 to the left.

The perception information capture device 120_3 may capture position information and posture information of the user U1 and the other users U3 and U4 (step S802), and transmit the position information and the posture information of the user U1 and the other users U3 and U4 to the processing device 130_3, for example. In this embodiment, the processing device 130_3 may select a first processing device according to a distance between each of the processing devices 130_1 to 130_3 and the position information of the user U1 and the other users U3 and U4 (step S804). The processing device 130_3 may calculate the distance between the processing devices 130_1 to 130_3 and the user U1. Similarly, the processing device 130_3 may calculate the respective distances between the processing devices 130_1 to 130_3 and the other users U3 and U4. The processing device 130_3 may find a minimum distance among the distances above and select the processing device associated with the minimum distance as the first processing device. In this exemplary embodiment, since the user U1 is at a minimum distance from the processing device 130_3, the processing device 130_3 is selected as the first processing device.

Next, the processing device 130_3 as the first processing device may identify the sight line information E3 of the user U1 and sight line information E5 and E6 of the other users U3 and U4 according to the position information and the posture information of the user U1 and the other users U3 and U4 (step S806).

The processing device 130_3 determines whether one (i.e., the perception information capture device 120_3) of the perception information capture devices 120_1 to 120_3 detects the user U1 and the other users U3 and U4 at the same time (step S808). In response to the perception information capture device 120_3 detecting the user U1 and the other users U3 and U4 at the same time (determined to be Yes in step S808), the processing device 130_3 calculates a common sight line direction according to the sight line information E3 of the user U1 and the sight line information E5 and E6 of the other users U3 and U4 (step S810), and selects a third processing device from the processing devices 130_1 to 130_3 and selects one of the displays 110_1 to 110_3 according to the common sight line direction (step S812). In some embodiments, the processing device 130_3 may calculate the average of the components of the sight line information E3 of the user U1 and the sight line information E5 and E6 of the other users U3 and U4 in each axial direction to obtain the common sight line direction.

In some embodiments, before calculating the common sight line direction, the processing device 130_3 may also determine whether a sight line direction difference between the sight line information E3 of the user U1 and the sight line information E5 and E6 of the other users U3 and U4 meets a predetermined condition. The processing device 130_3 may determine whether the angular difference between the sight line vector of the user U1 and the sight line vectors of the other users U3 and U4 is less than a threshold. If so, the sight line direction difference between the sight line information E3 of the user U1 and the sight line information E5 and E6 of the other users U3 and U4 may be determined to meet the predetermined condition, indicating that the user U1 and the other users U3 and U4 look at a similar position.

Furthermore, in this exemplary embodiment, since the common sight line direction falls on the display 110_1, the processing device 130_3 selects the third processing device according to the display 110_1 to which the common sight line direction is pointed. In this exemplary embodiment, the processing device 130_1 for controlling the display 110_1 is the third processing device. The processing device 130_3 may transmit the common sight line direction through at least one of the gateways G1 to Gk to the processing device 130_1 as the third processing device (step S814).

In addition, the perception information capture devices 120_1 to 120_3 may capture position information of the target Obj2 (step S816). Since the processing device 130_3 has been selected as the first processing device and the processing device 130_1 has been selected as the third processing device, the processing device 130_2 may be selected as a second processing device (step S818). The processing device 130_2 may receive the position information and other relevant information of the target Obj2 to further process target identification related to the target Obj2 (step S820). Next, the processing device 130_2 performs coordinate conversion and calculates a target coordinate of the target Obj2 according to the position information of the target Obj2 provided by the perception information capture devices 120_1 to 120_3 (step S822). The processing device 130_2 may transmit the target coordinate of the target Obj2 through at least one of the gateways G1 to Gk to the processing device 130_1 as the third processing device (step S824).

The processing device 130_1 may receive the position information of the user U1 through the gateways G1 to Gk or directly from the perception information capture device 120_1. Therefore, the processing device 130_1 performs coordinate conversion and calculates a user coordinate of the user according to the position information of the user U1 (step S826). The processing device 130_1 determines display position information of the virtual object Vf2 according to the user coordinate, the target coordinate, and the common sight line direction (step S828), and controls the display 110_1 to display the virtual object Vf2 according to the display position information of the virtual object Vf2 (step S830).

Figure 9:
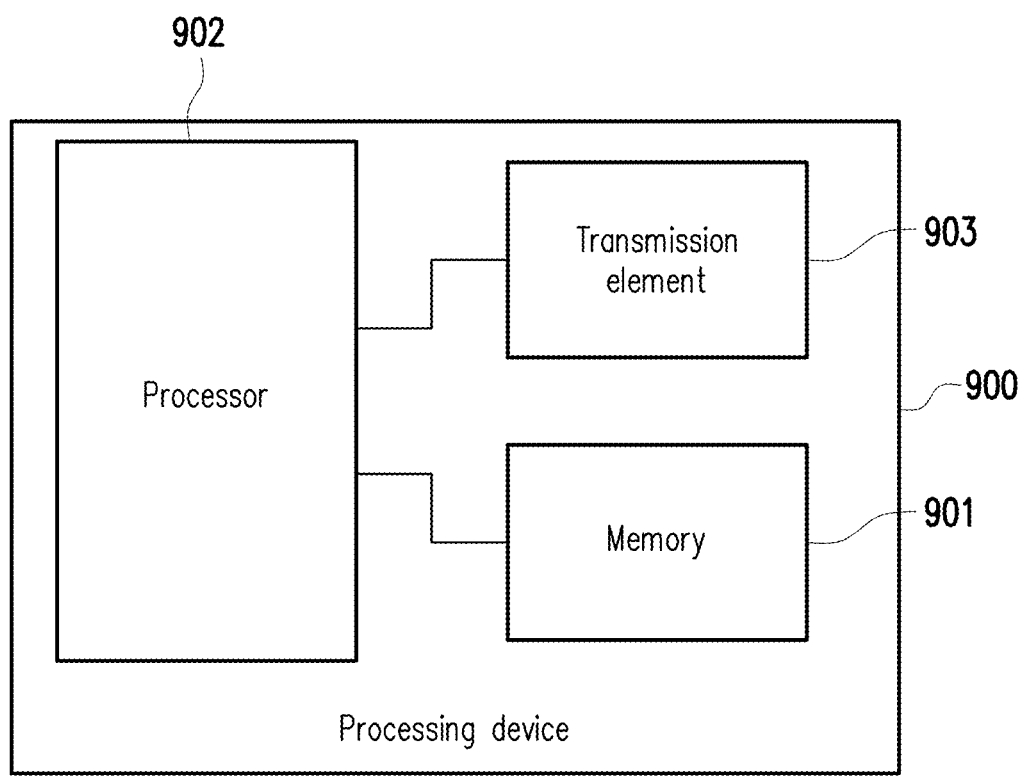
FIG. 9 is a block diagram of a processing device according to an exemplary embodiment of the disclosure.

FIG. 9 is a block diagram of a processing device according to an exemplary embodiment of the disclosure. A processing device 900 may be the processing devices 130_1 to 130_N of the embodiments above. With reference to FIG. 9, the processing device 900 may include a memory 901, a processor 902, and a transmission element 903. For example, the memory 901 may be any type of fixed or removable random access memory (RAM), read-only memory (ROM), flash memory, hard disks, or other similar devices, integrated circuits, or a combination thereof. For example, the processor 902 may be a central processing unit (CPU), an application processor (AP), or any other programmable general-purpose or special-purpose microprocessor, a digital signal processor (DSP), an image signal processor (ISP), a graphics processing unit (GPU), or other similar devices, integrated circuits, or a combination thereof. The transmission element 903 is a communication device supporting wired/wireless transmission protocols, such as a combination of a transceiver and an antenna. The processor 902 may execute commands, programming codes, or software modules recorded in the memory 901 to realize the information display method of the embodiments of the disclosure.

In the information display method, the information display system, and the processing device according to the exemplary embodiments of the disclosure, computing may be allocated to a plurality of processing devices according to the position and the sight line of the user, to improve computational efficiency and prevent delay in display services of merged virtuality and reality. Accordingly, the virtual object can be smoothly displayed in real time, improving the viewing experience of the user.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An information display system comprising:
a plurality of light-transmissive displays;
a plurality of perception information capture devices configured to capture position information and posture information of a user and capture position information of a target; and
a plurality of processing devices respectively corresponding to the displays, and being connected to and communicating with each other through a plurality of gateways,
wherein a first processing device is selected from the processing devices according to the position information of the user, and the first processing device determines sight line information of the user according to the position information and the posture information of the user provided by the perception information capture devices,
wherein a second processing device different from the first processing device performs coordinate conversion and calculates a target coordinate of the target according to the position information of the target provided by the perception information capture devices, and
wherein the first processing device selects a third processing device from the processing devices according to the sight line information of the user, the third processing device determines display position information of a virtual object according to a user coordinate and the target coordinate, and the third processing device controls one of the displays to display the virtual object according to the display position information of the virtual object.

2. The information display system according to claim 1, wherein the first processing device is closest in distance to the position information of the user among the processing devices.

3. The information display system according to claim 1, wherein the first processing device is the same as or different from the third processing device, and the third processing device performs coordinate conversion and calculates the user coordinate of the user according to the position information of the user provided by the perception information capture devices.

4. The information display system according to claim 1, wherein the second processing device transmits the target coordinate of the target to the third processing device through the gateways.

5. The information display system according to claim 1, wherein the first processing device identifies the one of the displays according to the sight line information of the user to select the third processing device from the processing devices according to the one of the displays.

6. The information display system according to claim 5, wherein the first processing device calculates a viewing angle range corresponding to the one of the displays according to the position information of the user, and the first processing device identifies the one of the displays from the displays in response to the sight line information of the user falling within the viewing angle range.

7. The information display system according to claim 6, wherein the first processing device determines whether the sight line information of the user still falls within the viewing angle range of the one of the displays in response to a change in the sight line information of the user; and
the first processing device identifies another one of the displays according to the sight line information of the user in response to the sight line information of the user not falling within the viewing angle range of the one of the displays to select another third processing device from the processing devices according to the another one of the displays.

8. The information display system according to claim 1, wherein the first processing device determines whether one of the perception information capture devices detects the user and a plurality of other users at the same time; and
the first processing device calculates a common sight line direction according to the sight line information of the user and sight line information of the other users in response to the one of the perception information capture devices detecting the user and the other users at the same time, and the first processing device selects the third processing device from the processing devices and selects the one of the displays according to the common sight line direction.

9. The information display system according to claim 8, wherein a sight line direction difference between the sight line information of the user and the sight line information of the other users meets a predetermined condition.

10. An information display method adapted for an information display system comprising a plurality of light-transmissive displays, a plurality of perception information capture devices, and a plurality of processing devices, the method comprising:
configuring the perception information capture devices to capture position information and posture information of a user and position information of a target;
selecting a first processing device from the processing devices according to the position information of the user;
determining sight line information of the user by the first processing device according to the position information and the posture information of the user provided by the perception information capture devices;
by a second processing device different from the first processing device, performing coordinate conversion and calculating a target coordinate of the target according to the position information of the target provided by the perception information capture devices;
selecting a third processing device from the processing devices according to the sight line information of the user; and
by the third processing device, determining display position information of a virtual object according to a user coordinate and the target coordinate, and controlling one of the displays to display the virtual object according to the display position information of the virtual object.

11. The information display method according to claim 10, wherein selecting the first processing device from the processing devices according to the position information of the user comprises:
selecting the first processing device closest in distance to the position information of the user from the processing devices.

12. The information display method according to claim 10, wherein the first processing device is the same as or different from the third processing device, and the method further comprises:
by the third processing device, performing coordinate conversion and calculating the user coordinate of the user according to the position information of the user provided by the perception information capture devices.

13. The information display method according to claim 10, further comprising:
transmitting, by the second processing device, the target coordinate of the target to the third processing device through a plurality of gateways.

14. The information display method according to claim 10, wherein selecting the third processing device from the processing devices according to the sight line information of the user comprises:
identifying the one of the displays by the first processing device according to the sight line information of the user; and
selecting the third processing device from the processing devices according to the one of the displays.

15. The information display method according to claim 14, wherein identifying the one of the displays by the first processing device according to the sight line information of the user comprises:
calculating a viewing angle range corresponding to the one of the displays by the first processing device according to the position information of the user; and
identifying the one of the displays from the displays by the first processing device in response to the sight line information of the user falling within the viewing angle range.

16. The information display method according to claim 15, further comprising:
determining whether the sight line information of the user still falls within the viewing angle range of the one of the displays by the first processing device in response to a change in the sight line information of the user; and
identifying another one of the displays by the first processing device according to the sight line information of the user in response to the sight line information of the user not falling within the viewing angle range of the one of the displays to select another third processing device from the processing devices according to the another one of the displays.

17. The information display method according to claim 10, further comprising:
determining whether one of the perception information capture devices detects the user and a plurality of other users at the same time by the first processing device; and
calculating by the first processing device a common sight line direction according to the sight line information of the user and sight line information of the other users in response to the one of the perception information capture devices detecting the user and the other users at the same time,
wherein selecting the third processing device from the processing devices according to the sight line information of the user comprises:
selecting the third processing device from the processing devices and selecting the one of the displays according to the common sight line direction.

18. The information display method according to claim 17, wherein a sight line direction difference between the sight line information of the user and the sight line information of the other users meets a predetermined condition.

19. A processing device connected to a light-transmissive display and a perception information capture device, and connected to a plurality of other processing devices through a plurality of gateways, wherein the perception information capture device is configured to capture position information and posture information of a user and capture position information of a target, and the processing device comprises:
a memory configured to store data; and
a processor connected to the memory and configured to:
determine, by the perception information capture device, that a distance between the processing device and the user is less than a distance between each of the plurality of other processing devices and the user;
determine sight line information of the user according to the position information and the posture information of the user provided by the perception information capture device; and
select one of the plurality of processing devices according to the sight line information of the user, and transmit the sight line information of the user to the one of the plurality of processing devices through the gateways, wherein the one of the plurality of processing devices determines display position information of a virtual object according to the sight line information, a user coordinate, and a target coordinate, and controls the display or another display connected to the other processing devices to display the virtual object according to the display position information of the virtual object.

* * * * *